United States Patent
Parat et al.

[11] Patent Number: 5,825,603
[45] Date of Patent: Oct. 20, 1998

[54] METHOD AND APPARATUS FOR PROVIDING ELECTROSTATIC DISCHARGE PROTECTION FOR HIGH VOLTAGE INPUTS

[75] Inventors: Krishna Parat; Timothy J. Maloney, both of Palo Alto, Calif.

[73] Assignee: Intel Corporaiton, Santa Clara, Calif.

[21] Appl. No.: 921,809

[22] Filed: Sep. 2, 1997

Related U.S. Application Data

[63] Continuation of Ser. No. 576,079, Dec. 21, 1995, abandoned.

[51] Int. Cl.⁶ .................................................. H02H 3/22
[52] U.S. Cl. .............................. 361/111; 361/56; 361/88
[58] Field of Search .................................. 361/54, 56, 88, 361/89, 91, 111; 257/355

[56] References Cited

U.S. PATENT DOCUMENTS

| | | | |
|---|---|---|---|
| 5,255,146 | 10/1993 | Miller | 361/56 |
| 5,400,202 | 3/1995 | Metz et al. | 361/56 |
| 5,463,520 | 10/1995 | Nelson | 361/56 |
| 5,528,188 | 6/1996 | Au et al. | 327/310 |

OTHER PUBLICATIONS

Maloney & Dabri, *Novel Clamp Circuits for IC Power Supply Protection,* EOS/ESD Symposium, Phoenix, Ariz., Sep. 12, 1995.

Wheatley, Jr., *On the Proportioning of Chip Area for Multistage Darlington Power Transistors,* IEEE Trans. Electron. Devices, ED–23, pp. 870–878, 1976.

*Primary Examiner*—Jeffrey A. Gaffin
*Assistant Examiner*—Stephen W. Jackson
*Attorney, Agent, or Firm*—Blakely, Sokoloff, Taylor & Zafman

[57] ABSTRACT

An arrangement for preventing damage to a circuit of an integrated circuit due to the occurrence of voltage transients introduced externally to the integrated circuit. According to one embodiment, the voltage transients are due to electrostatic discharge (ESD). The arrangement comprises a latch for coupling to an input pad of the integrated circuit. The latch asserts a first signal in response to sensing the occurrence of the voltage transient at the input pad. A transient protection circuit is coupled to the input pad for coupling the input pad to ground in response to the latch asserting the first signal such that current associated with the voltage transient is shunted to ground. A circuit is coupled to the latch for preventing the latch from asserting the first signal in response to the occurrence of the voltage transient if a predetermined condition exists. According to a present embodiment, the circuit is a timer that disables the latch in response to a supply output voltage VCC exceeding a predetermined level.

12 Claims, 9 Drawing Sheets

METHOD AND APPARATUS FOR PROVIDING ELECTROSTATIC DISCHARGE PROTECTION FOR HIGH VOLTAGE INPUTS

This is a continuation of application Ser. No. 08/576,079, filed Dec. 21, 1995, now abandoned.

FIELD OF THE INVENTION

The present invention relates to electrostatic discharge (ESD) protection for integrated circuits, and more specifically to methods and apparatus for steering ESD current away from integrated circuits.

BACKGROUND OF THE INVENTION

Advances in silicon process technology have led to the development of increasingly smaller sizes for transistors in integrated circuits. In turn, the decreasing size of transistors has made the circuits increasingly susceptible to damage from ESD events.

In order to protect these circuits from damage certain ESD protection schemes have been developed. To aid in the development of protection schemes, various types of tests to simulate the conditions that cause ESD events have been developed to further research of ESD protection circuitry. These tests include the human body model test, the charged device model test and the machine model test.

Previous approaches to ESD protection include thick-field oxide and silicon-controlled rectifier devices. These devices have been effective as input protection but ineffective as power supply clamps because of triggering difficulties and shunting of ESD current through other parts of the power bus.

Previous approaches also include use of a cantilever diode string. A cantilever diode string is a series of diodes connected such that when the voltage on one end of the string, usually corresponding to a pad, reaches a certain level, the diodes turn on and create a short circuit current path between the pad and ground potential. The cantilever diode string steers the ESD current away from the integrated circuit that could be destroyed by large amounts of current. These diode strings have been effective in the human body model test and the machine model tests.

Cantilever diode strings alone are not effective when the voltage on the pad protected is to be switched between multiple voltage levels. On pads where voltages are to be switched, cantilever diode strings alone may treat each high voltage pulse as an ESD event and couple the pad to ground potential. This would make the high-voltage pad ineffective. An alternative is to leave the pad unprotected against ESD events. However, leaving any pad unprotected increases the opportunity for the integrated circuit to be destroyed by an ESD event.

High voltage programming pins such as those found on programmable memory devices are difficult to protect with traditional ESD protection circuits because a high voltage, high current pulse is required to program the memory circuit, and the high current requires low impedance to the vulnerable circuit. Cantilever diode strings would connect the high voltage programming pulse to ground potential and prevent the programming pulse from programming the memory circuit.

Cantilever diode strings serve as effective power supply ESD protection without the triggering difficulties of thick-field oxide and silicon-controlled rectifier devices. Because they provide a defined path for ESD current between the pad and ground, cantilever diode strings remove the uncertainty from ESD protection schemes which pass current to a power supply bus. Also, cantilever diode strings do not cause damage due to wearout in the power supply bus, which allows circuits to survive hundreds or thousands of ESD events.

The standard cantilever diode string as used on low voltage power supply pads cannot be used on pads where fast powering up will occur. However, using the novel circuit disclosed herein, appropriate protection depending on whether the voltage on a pad is an ESD event or a normal operating voltage can be obtained. Thus it can effectively pass ESD current during an ESD event, while acting as an open circuit under normal operating conditions.

SUMMARY OF THE INVENTION

An electrostatic discharge (ESD) protection circuit is disclosed. According to one embodiment, the ESD protection circuit comprises a pull up transistor, a pull down transistor, an inverter, and a timing circuit. The pull up transistor and the pull down transistor are commonly coupled to an output. The inverter increases the drive on the pull up transistor to generate an output in response to an ESD event. The timer circuit enables the pull down transistor a predetermined length of time after the circuit receives normal supply voltage. When the pull down transistor is enabled, the output is pulled down to ground.

An alternative embodiment adds a breakdown detector to the ESD protection circuit. The breakdown detector generates an output in response to breakdown of transistors in the ESD protection circuit. This output is generated whether or not the pull down transistor is enabled.

BRIEF DESCRIPTION OF THE DRAWINGS

The objects, features and advantages of the present invention will be more fully described in the following detailed description, wherein.

DETAILED DESCRIPTION

An arrangement for preventing damage to a circuit of an integrated circuit due to the occurrence of voltage transients introduced externally to the integrated circuit is described. Generally, the arrangement provides protection against voltage transients for certain circumstances and disables such protection for other circumstances. According to present embodiments, the arrangement is used to prevent damage due to ESD events. ESD protection is enabled when power is not supplied to an integrated circuit and disabled when the supply voltage supplied to the integrated circuit reaches a predetermined level.

Figure 1:
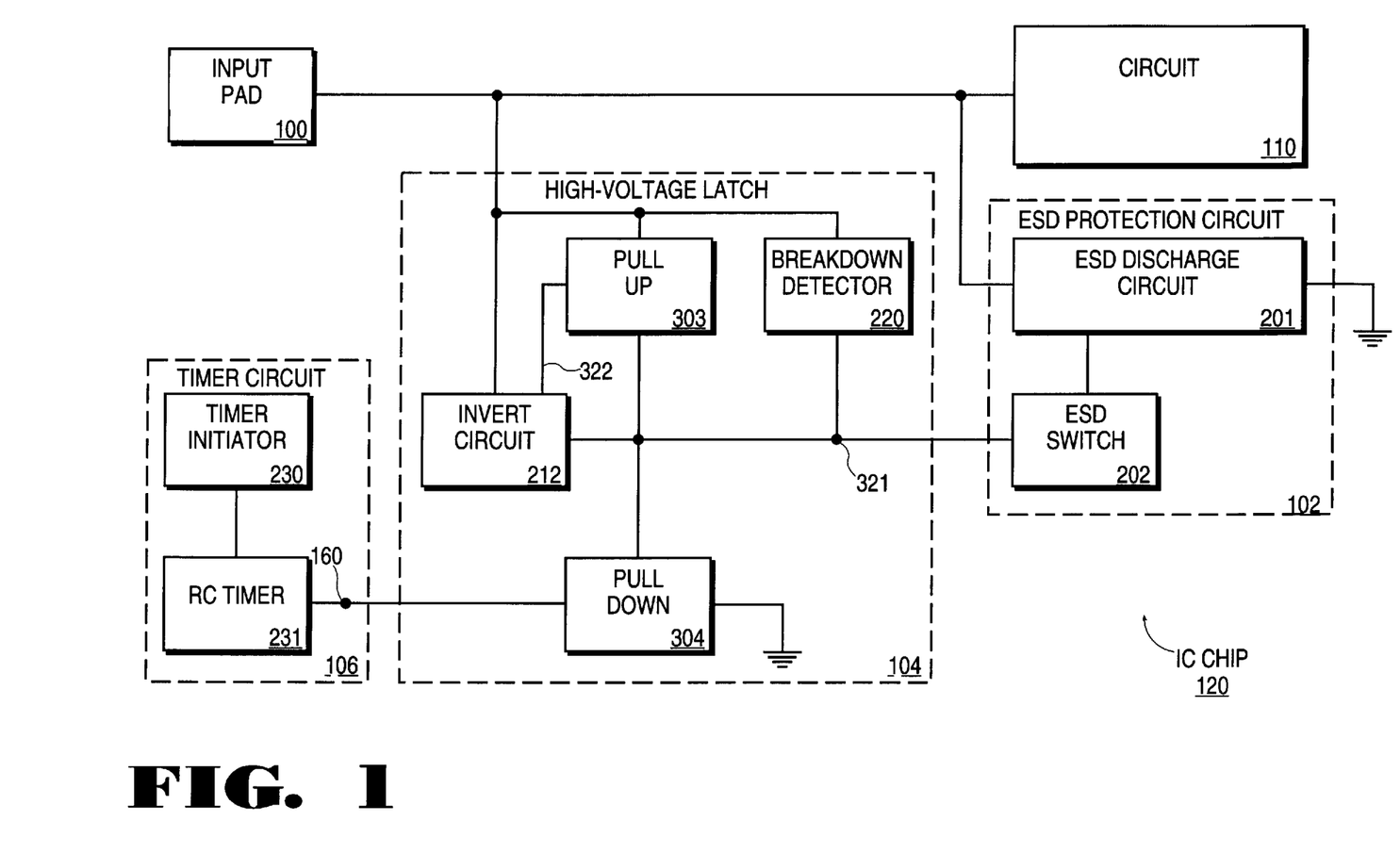
FIG. 1 is a block diagram of an electrostatic discharge circuit of one embodiment.

FIG. 1 is a block diagram of an ESD protection circuit of one embodiment. Input pad 100 connects a voltage source external to integrated circuit (IC) chip 120 to circuits contained thereon including circuit 110 and the ESD ( or transient) protection circuit 102. Input pad 100 is coupled to circuit 110, ESD protection circuit 102 and high-voltage latch 104.

The output of timer circuit 106 is coupled to an input of high-voltage latch 104 at a node 160, and the output of high-voltage latch 104 is coupled to an input of ESD protection circuit 102 at node 321. Timer circuit 106 disables high-voltage latch 104 a predetermined amount of time after acceptable supply voltage (Vcc) has been applied to IC chip 120. When high-voltage latch 104 is disabled, ESD protection circuit 102 is also disabled. Under these conditions, the voltage applied to input pad 100 is applied to circuit 110.

At any time before timer circuit 106 disables high-voltage latch 104, if a voltage is applied to input pad 100, high-voltage latch 104 enables ESD protection circuit 102. When enabled, ESD protection circuit 102 couples input pad 100 to ground, thus steering any current away from circuit 110 to ground.

As shown, timer circuit 106 comprises timer initiator 230 and RC timer 231. RC timer 231 generates the output of timer circuit 106 at node 160. Timer initiator 230 initiates RC timer 231 when Vcc reaches an acceptable level. The output of timer circuit 106 rises as an RC function of Vcc such that node 160 reaches a predetermined voltage level at a predetermined time after Vcc reaches an acceptable level. For the present embodiment, the output of timer circuit 106 generates an output in the range of 2 to 3 volts approximately 1–2 microseconds after Vcc is applied to circuit 110. The time delay and output voltage levels can be adjusted as desired by adjusting the RC time constant of RC timer 231 or by any other reasonable method. High-voltage latch 104 is disabled when the voltage at node 160 exceeds the predetermined voltage level.

RC timer 231 guards against false power ups of the power supply lines (not shown) of circuit 110. An RC time constant that is longer than the duration of an ESD event is used to prevent high-voltage latch 104 from being disabled during an ESD event.

High-voltage latch 104 comprises pull up 303 and pull down 304 coupled to invert circuit 212. Invert circuit 212 receives as its input the voltage at node 321 and generates as its output a voltage at node 322 to control pull up 303. FIG. 1 also shows breakdown detector 220 coupled to invert circuit 212 and input pad 100. Breakdown detector 220 is an optional element that will be described in greater detail below. Pull down 304 is coupled to the output of timer circuit 106 and pulls node 321 down to ground when timer circuit 106 disables high-voltage latch 104. Pull up 303 cannot overcome pull down 304.

When node 321 is not pulled down by pull down 211, node 321 floats. Initially, node 321 floats at ground unless a voltage is applied to input pad 100. When a voltage is applied to input pad 100, pull up 303 pulls node 321 up to the voltage of input pad 100. Invert circuit 212 provides positive feedback to improve the transition of node 321.

Breakdown detector 220 pulls node 321 up when transistors in high-voltage latch 104 begin to breakdown, whether or not pull down 304 is pulling node 321 down. Breakdown detector 220 drives node 321 high at the breakdown voltage of a field effect transistor. Breakdown detector 220 does not provide protection from an ESD event. If circuit conditions exist that would damage circuit 110 by causing breakdown of transistors, ESD protection circuit 102 is enabled by breakdown detector 220 to drain off excess current.

ESD protection circuit 102 comprises ESD discharge circuit 201 and ESD switch 202. ESD switch 202 is coupled to node 321 to enable ESD discharge circuit 201 at appropriate times. When enabled, ESD discharge circuit 201 couples input pad 100 to ground, thus short circuiting the connection between input pad 100 and circuit 110. When disabled, ESD discharge circuit 201 acts as an open circuit, which allows the input to input pad 100 to be applied to circuit 110.

Figure 2:
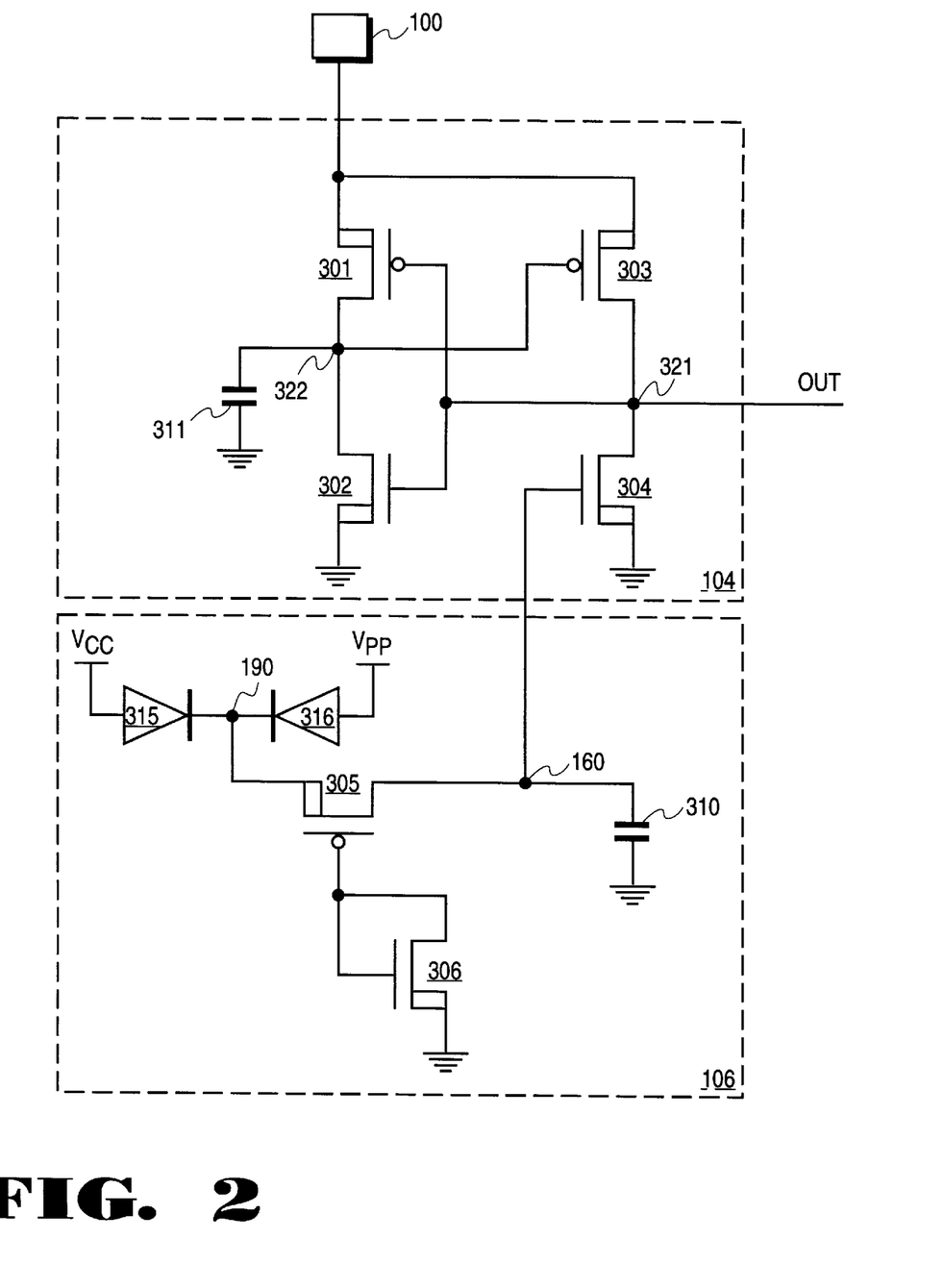
FIG. 2 shows an embodiment of a high-voltage latch and timer circuit.

FIG. 2 is an embodiment of high-voltage latch 104 and timer circuit 106. In timer circuit 106, diodes 315 and 316 comprise timer initiator 230. Capacitor 310 along with transistors 305 and 306 comprise RC timer 231. Diodes 315–316 and input voltage Vpp are not necessary to provide ESD protection; however, the addition of diodes 315–316 and Vpp provides useful functionality that is described in greater detail below.

In the absence of diodes 315 and 316, when a voltage is applied to node 190 of FIG. 2 via Vcc, Vcc is applied to the source of transistor 305. Transistor 305 provides the resistance for the RC timer circuit. When Vcc is applied to transistor 305, capacitor 310 begins to charge. As capacitor 310 charges, the gate drive on transistor 304 of high-voltage latch 104 increases as a function of the RC characteristics of timer circuit 106 and Vcc.

Diodes 315 and 316 allow the ESD protection circuit to properly function when more than one circuit incorporating the ESD protection described herein receives an input from input pad 100. With Vpp applied to node 190 via diode 316 and no voltage applied to node 190 via diode 315, capacitor 310 charges, which increases the gate drive on transistor 304 and pulls node 321 down. Without diodes 315 and 316, an ESD protection circuit that does not have Vcc applied to node 190 via diode 315 treats inputs to input pad 100 as ESD events.

Transistors 303 and 304 of high-voltage latch 104 comprise pull up 303 and pull down 304, respectively, as shown in FIG. 1. Invert circuit 212 comprises transistors 301 and 302 along with capacitor 311. Transistor 304 is a large enough device that node 321 is pulled to ground when transistor 304 is fully on whether transistor 303 is on or not. Thus, if timer circuit 106 enables transistor 304, node 321 is pulled down. If transistor 304 is not on, node 321 remains at ground, and if a voltage is applied to input pad 100, transistor 303 pulls node 321 up to the voltage of input pad 100. Transistors 301 and 302 are sized such that when a voltage is applied to input pad 100, the voltage at node 321 rises faster than the voltage at node 322.

When a voltage is applied to input pad 100, transistor 301 and transistor 304 turn on and begin to charge node 321 and node 322, respectively to higher voltages. Transistor 301 is sized such that it can conduct less current than transistor 302. Because of this sizing difference, the voltage on node 321 increases faster than the voltage on node 322. Capacitor 311 enhances this action. However, capacitor 311 is not required to achieve the result desired by the high-voltage latch 104.

As the voltage of node 321 increases, the gate drive on transistor 301 is reduced, and the gate drive on transistor 302 is increased, this decreases the voltage on node 322 and increases the gate drive on transistor 303, which increases the voltage at node 321. The net result is that node 321 is at a high voltage, node 322 is at a low voltage, and the high-voltage latch 104 latches into this state.

The voltage at node 321 is used to enable ESD switch 202, which enables ESD discharge circuit 201. When enabled, ESD discharge circuit 201 couples input pad 100 to ground. High-voltage latch 104 remains in this state until the ESD event has concluded and a voltage is no longer applied to input pad 100. Once capacitor 311 discharges, node 321 returns to floating at ground until either transistor 301 or 302 is enabled.

Figure 3:
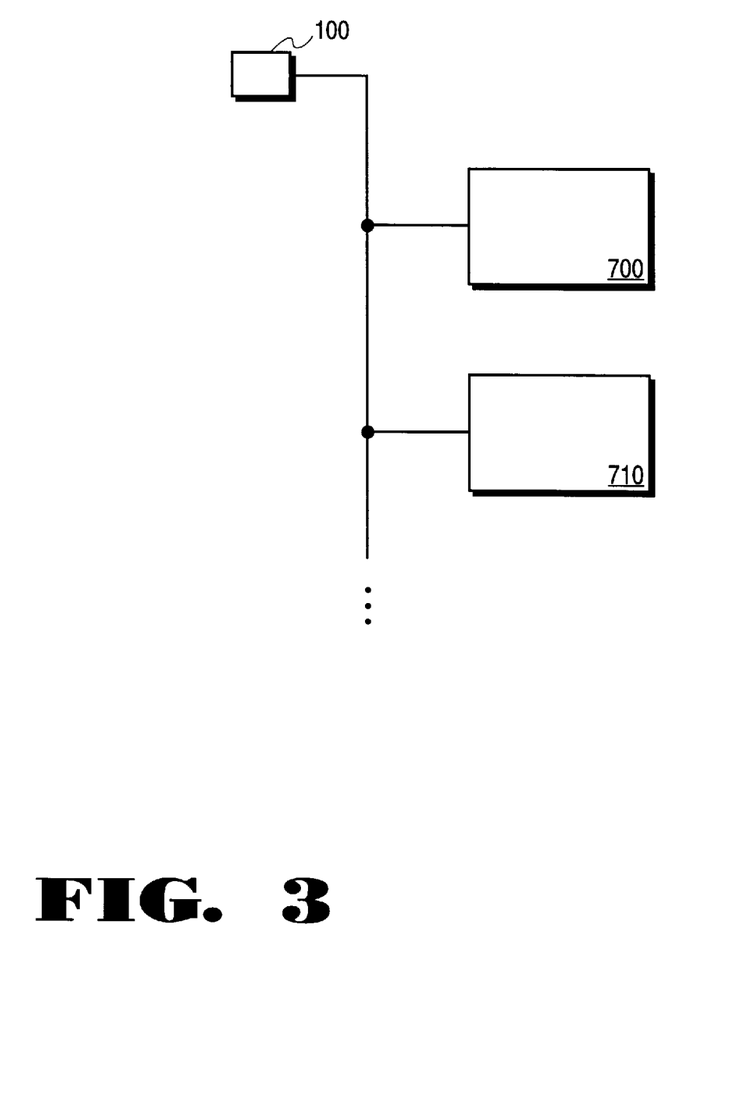
FIG. 3 is a block diagram of two circuits incorporating protection schemes that operate according to one embodiment.

FIG. 3 shows two circuits that operate according to an embodiment incorporating diode 316 and is useful for demonstrating the effect of diode 316. Assuming circuits 700 and 710 each include the arrangement described in FIGS. 1 and 2 including diode 316, if input pad 100 receives an input and no voltage is applied to node 190 via diode 315, the input at input pad 100 is treated as an ESD event and node 321 goes high. This is the appropriate result because if node 190 has no voltage applied via diode 315, the circuit is not under normal operating conditions, and the voltage applied to input pad 100 can be disregarded. However, if circuits 700 and 710 do not include diode 316, circuit 700 has a voltage applied via diode 315 and circuit 710 does not, the ESD protection of circuit 710 shorts the input intended for the functional circuit.

This occurs because, in the absence of diode 316 in both circuits 700 and 710, any voltage applied to input pad 100 is treated as an ESD event even if the voltage applied to input pad 100 is an appropriate input to one of the circuits. For example, if circuit 700 has a voltage applied to node 190 and circuit 710 does not, any input applied to input pad 100 intended for circuit 700 will be treated as an ESD event by circuit 710. Circuit 710 shorts input pad 100 to ground and prevents the input applied to input pad 100 from being applied to circuit 700.

If both circuit 700 and 710 have ESD protection circuits of the present invention with diode 316, and circuit 700 has a voltage applied to node 190 while circuit 701 does not, circuit 710 does not treat inputs to input pad 100 as an ESD event. This is because diode 316 in circuit 710 allows timer circuit in circuit 710 to disable high-voltage latch of circuit 710.

Figure 4:
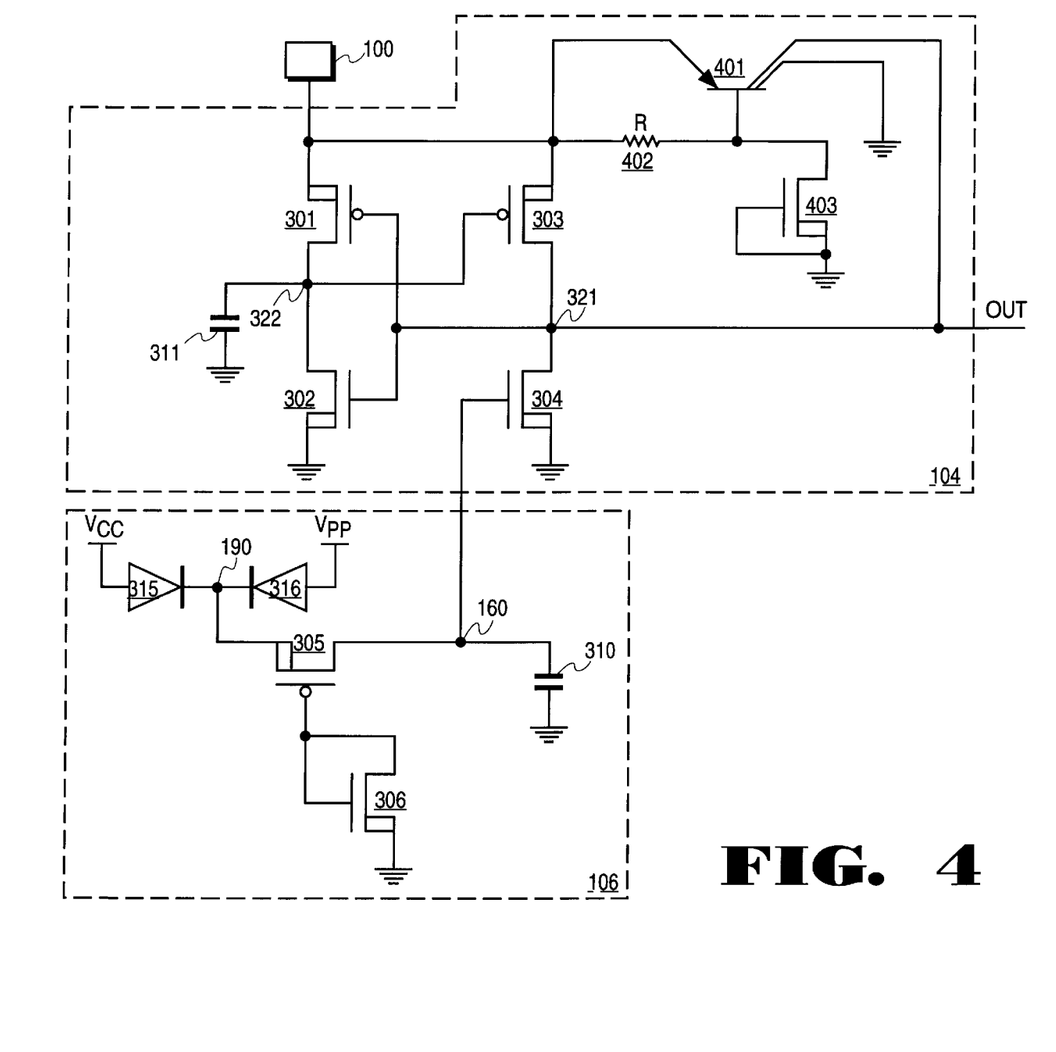
FIG. 4 is an embodiment of a high-voltage latch including a circuit for triggering ESD protection as device breakdown begins and a timer-based triggering circuit.

FIG. 4 is timer circuit 106 as shown in FIG. 2 and high-voltage latch 104 with the addition of breakdown detector 220, which comprises bipolar junction transistor (BJT) 401, resistor 402 and transistor 403. When transistor 403 begins to enter breakdown, it begins to conduct current. The current is drawn through resistor 402, which causes a voltage differential between the emitter and base of BJT 401. When this voltage reaches the threshold voltage of BJT 401, it turns on and pulls node 321 up to the voltage applied to input pad 100. BJT 401 must be large enough to overcome transistor 304. BJT 401 also conducts current to ground through a grounded collector. Breakdown detection is not necessary to provide ESD protection using the circuit of FIG. 2. It does, however, provide greater protection for circuit 110.

Figure 5:
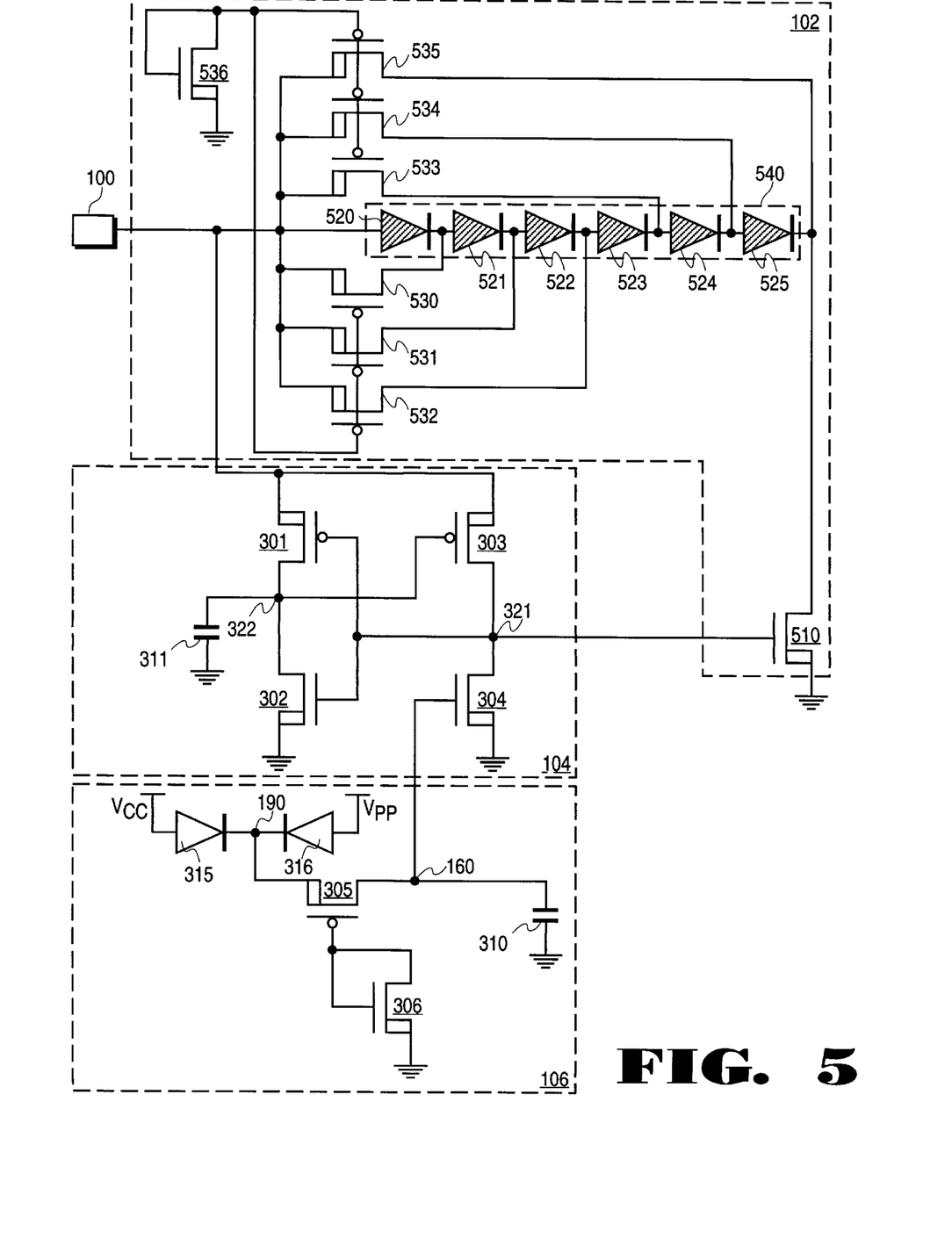
FIG. 5 is an embodiment of a high-voltage latch and timer-based triggering circuit controlling an electrostatic discharge protection circuit.

FIG. 5 is one embodiment of the high-voltage latch 104, the timer circuit 106 and the input pad 100 coupled to the ESD protection circuit 102. The ESD protection circuit shown in FIG. 5 is a cantilever diode string 540. However, other ESD protection circuits may be used in conjunction with the high-voltage latch 104 and the timer circuit 106 as shown in FIG. 5 to implement ESD protection. The high-voltage latch 104 can be used to enable the chosen ESD protection circuit 102 at the appropriate times.

The cantilever diode string 540 is shown by diodes 520–525. In order to reduce leakage current through diodes 520–525, transistors 530–536 are used. Transistors 530–535 are long-channel p-type FET transistors capable of sinking small amounts of current. Diodes 520–525 act as pnp BJTs where the substrate of the IC acts as a collector. This allows each diode to sink current as well as pass current to ground through transistor 510.

Transistor 510 operates as a switch that couples the cathode of diode 525 to ground potential when transistor 510 is turned on by the output of the high-voltage latch 104. When the cathode of diode 525 is coupled to ground potential, diode 525 turns on and operates as a short circuit. This couples the cathode of diode 524 to ground potential which turns diode 524 on. The forward biasing of diodes 520–525 continues up the cantilever diode string 540 until all of the diodes 520–525 are turned on.

When all of the diodes 520–525 are on, the input pad 100 is coupled to ground potential, and current from the input pad 100 is drawn to ground thus protecting the IC from high currents that can destroy the circuit 110.

When the ESD event has concluded, the input pad 100 returns to having no voltage applied. This causes the high-voltage latch 104 to turn the transistor 510 off, and the cathode of diode 525 is no longer coupled to ground. When the cathode of diode 525 is not connected to ground and the input pad 100 no longer has a voltage applied, diode 525 is no longer forward biased and turns off. When diode 525 turns off, the cathode of diode 524 is no longer coupled to ground potential.

Figure 6:
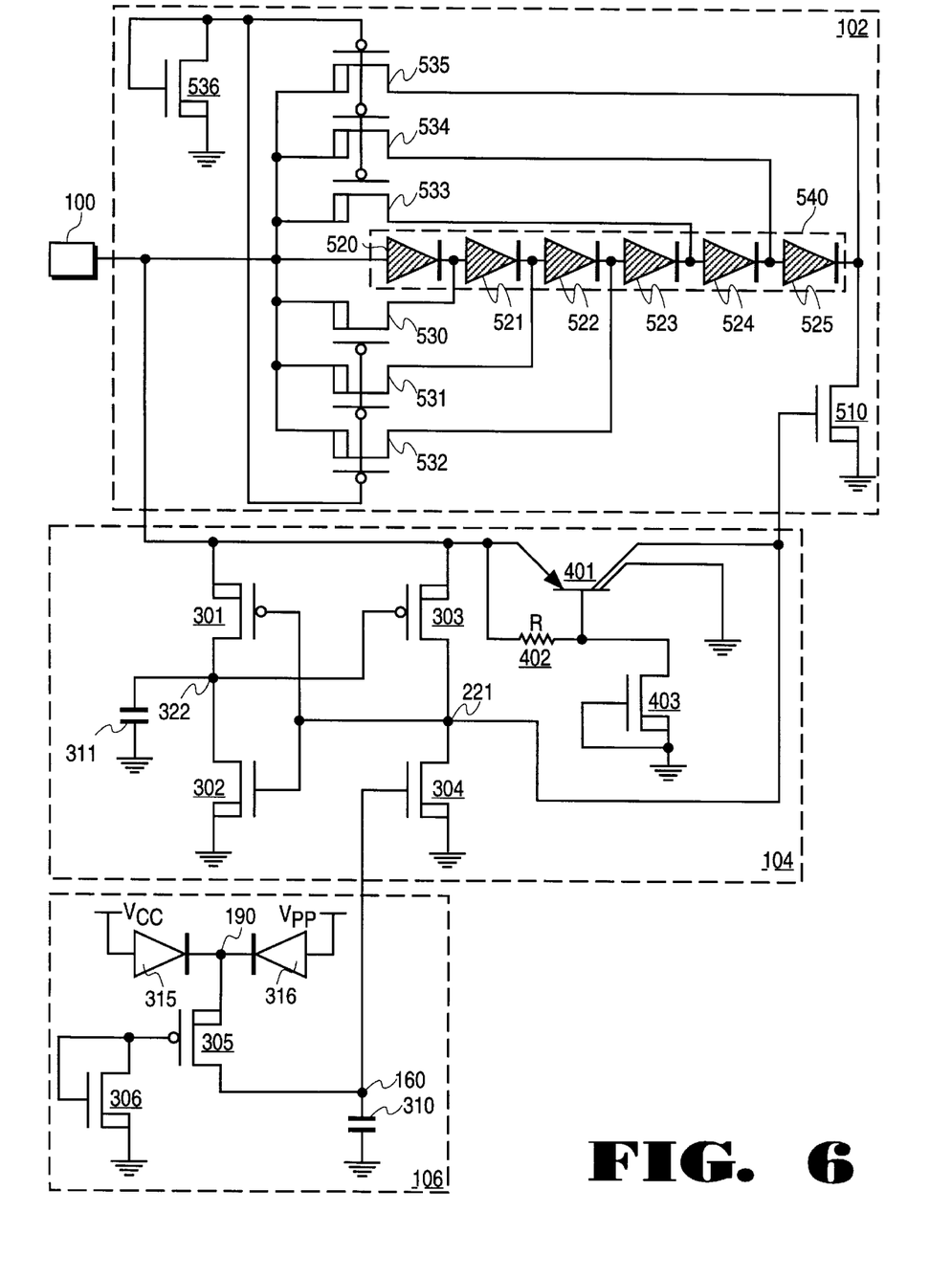
FIG. 6 is an embodiment of a high-voltage latch including a circuit for triggering ESD protection as device breakdown begins and a timer-based triggering circuit that controls an electrostatic discharge protection circuit.

When the cathode of diode 524 is not coupled to ground potential and high-voltage latch 104 does not have a voltage applied to it, diode 524 is no longer forward biased and is turned off. This continues up the cantilever diode string 540 until all of the diodes turn off. When the diodes 520–525 of the cantilever diode string 540 turn off the input pad 100 is no longer coupled to ground potential, thus the voltage and current applied to the high-voltage pad are passed to the main circuit. FIG. 6 shows an alternative arrangement to that shown in FIG. 5 wherein latch 104 further includes components for performing breakdown detection as previously described.

Figure 7:
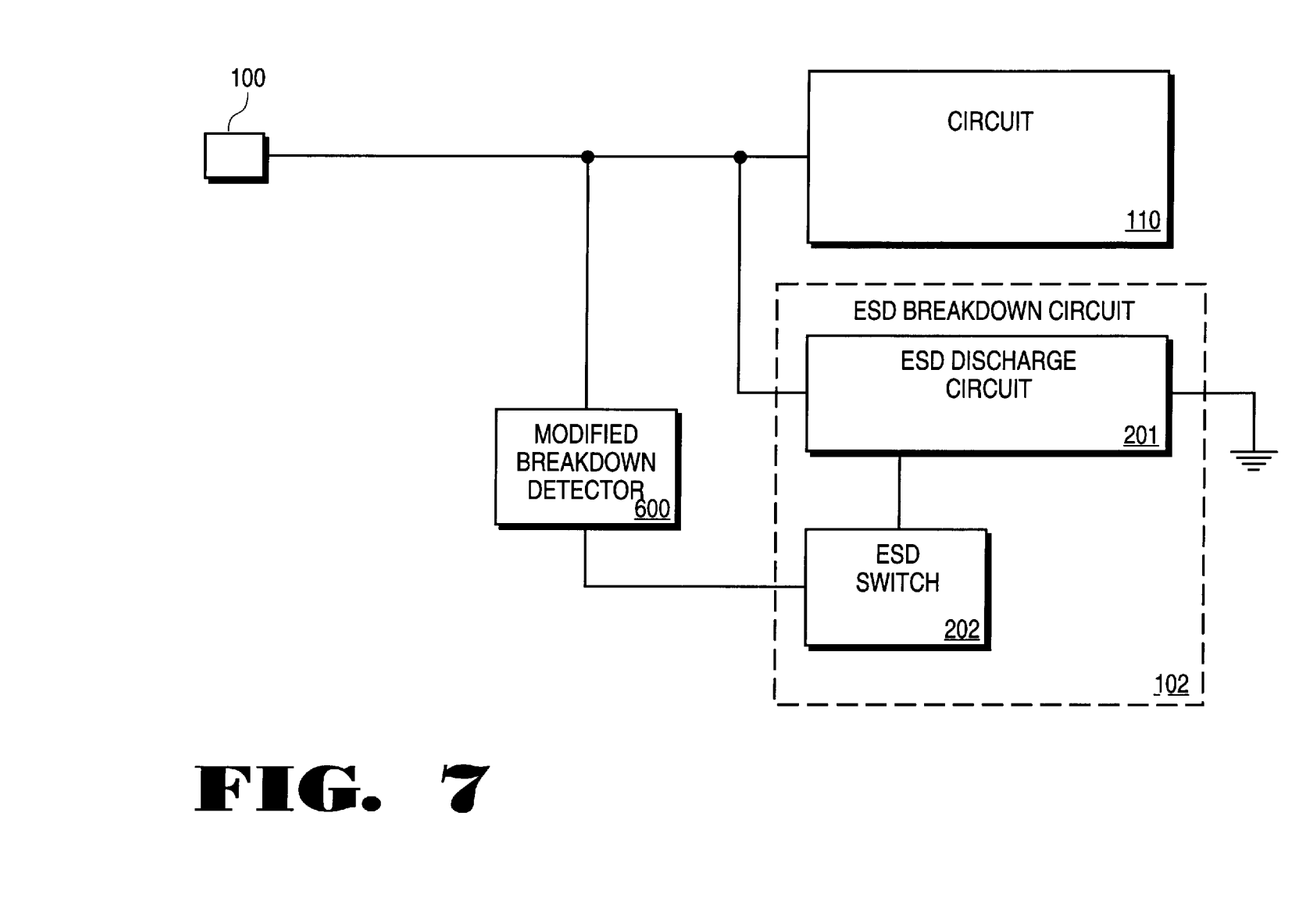
FIG. 7 is a block diagram of an alternative embodiment of an electrostatic discharge circuit.

FIG. 7 shows a block diagram for an alternative embodiment. The alternative implementation is based on breakdown of FET transistors rather than voltage level as with the embodiment previously discussed. ESD protection circuit 102 comprising ESD discharge circuit 201 and ESD switch 202 may be the same circuits as shown in FIG. 1.

Figure 8:
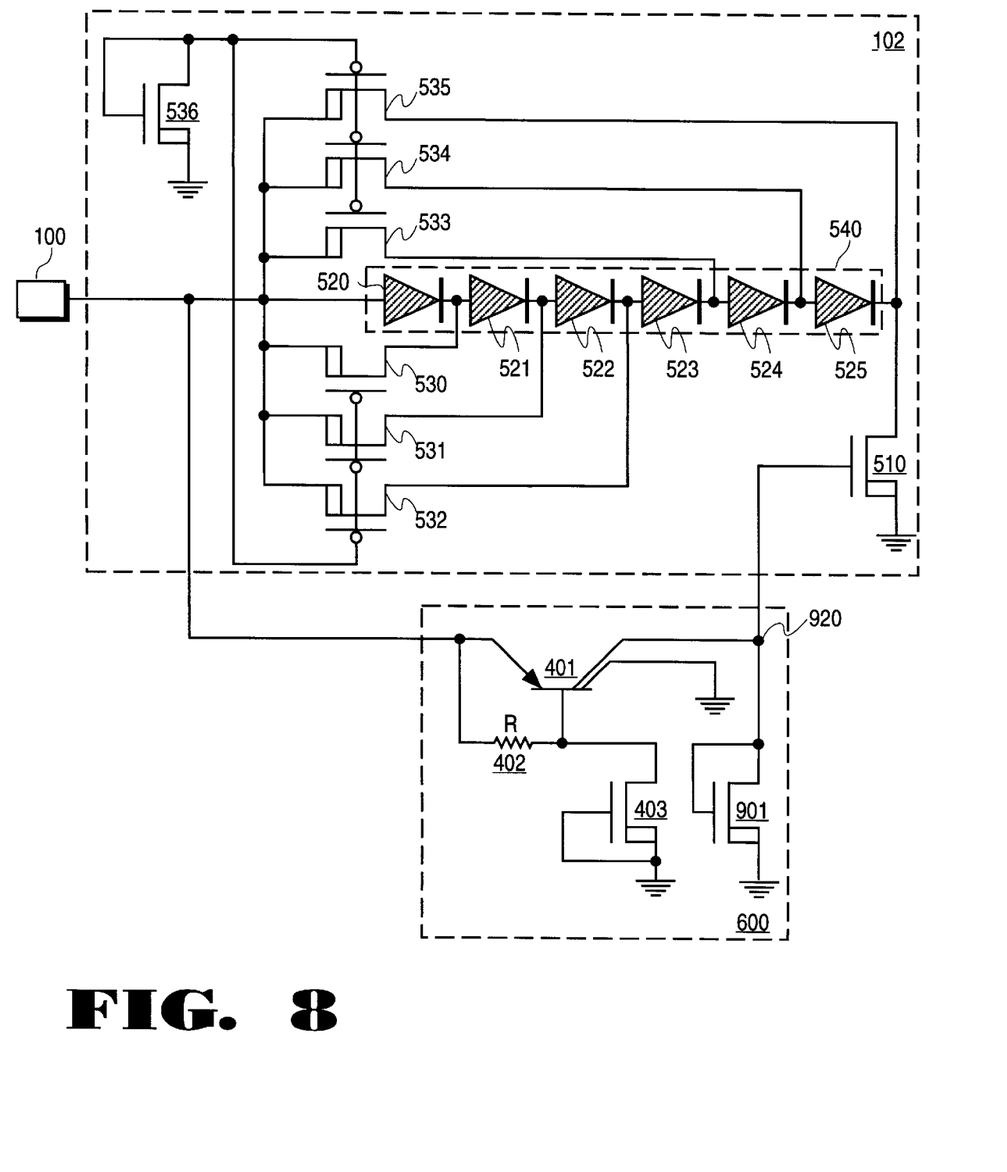
FIG. 8 is an embodiment of an electrostatic discharge circuit controlled by a breakdown detector.

FIG. 8 shows the embodiment of FIG. 7 in greater detail. Transistor 901 is a low threshold voltage device. The gate of transistor 901 is coupled to the source of transistor 901, which maintains the voltage at node 920 at ground until transistor 403 enters breakdown. When transistor 403 enters breakdown, it begins to conduct, which draws current through resistor 402. The current drawn through resistor 402 creates a voltage drop between the base and emitter of BJT 401. When the voltage drop between the base and emitter of BJT 401 is large enough, BJT 401 turns on and conducts current to ground through transistor 901.

When current is conducted through transistor 901, the voltage at node 920 rises and turns transistor 510 on. As explained above, when transistor 510 turns on, diodes 520–525 of cantilever diode string 540 turn on an conduct current from input pad 100 to ground. This continues until transistor 403 is no longer in breakdown, at which time transistor 403 stops conducting current and BJT 401 turns off.

Figure 9:
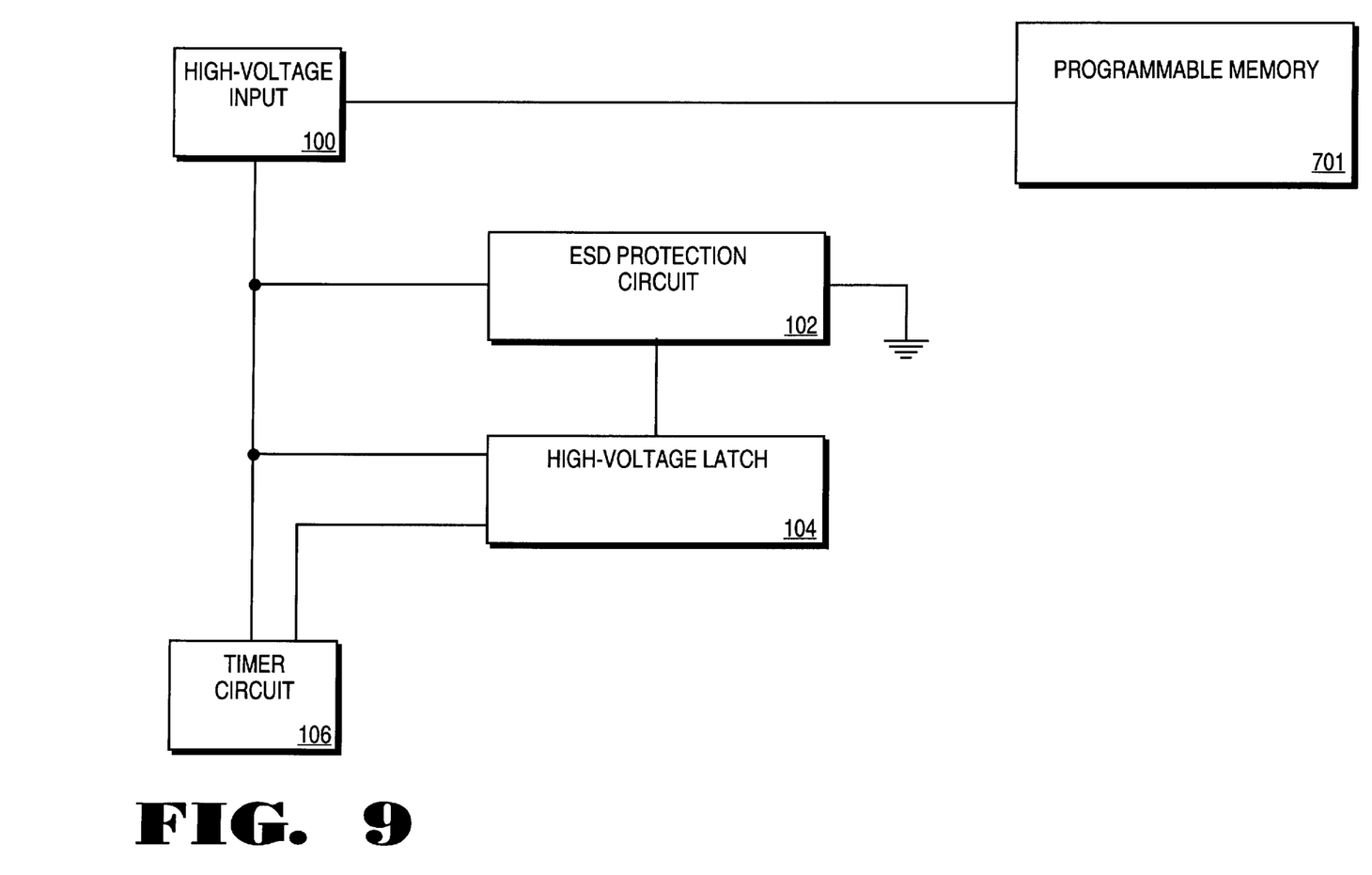
FIG. 9 is a block diagram of a programmable memory system incorporating the electrostatic discharge protection circuit.

FIG. 9 shows a high level diagram of a programmable memory system incorporating an ESD protection circuit. A programmable memory system often requires a high-voltage programming pulse as an input. When a high voltage is placed on the input pad 100, the ESD protection scheme must be able to differentiate between an ESD event and a programming pulse.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. An arrangement for preventing damage to a circuit of an integrated circuit due to the occurrence of voltage introduced externally to the integrated circuit, comprising:
    a latch coupled to an input pad of the integrated circuit, the latch asserting a first signal for a first predetermined period of time in response to sensing the occurrence of the voltage at the input pad, wherein the first predetermined period of time is longer than a period of time required for an anticipated electrostatic discharge (ESD) event;
    a transient protection circuit coupled to the input pad that couples the input pad to ground in response to the latch asserting the first signal such that current associated with the voltage is shunted to ground; and
    a timer circuit coupled to the latch for preventing the latch from asserting the first signal in response to a voltage supply output (VCC) rising to an acceptable voltage level that indicates that power has been applied to the integrated circuit for a second predetermined period of time.

2. An arrangement for preventing damage to a circuit of an integrated circuit due to the occurrence of an electrostatic discharge (ESD) event, comprising:
    a pull up transistor coupled to an input pad of the integrated circuit and an output node, the pull up transistor for setting the output node to a first level for a first predetermined period of time by being switched on in response to detecting the ESD event occurring at the input pad;
    a pull down transistor coupled to the output node for setting the output node to a second level when switched on, the pull down transistor being sized relative to the pull up transistor such that the output node remains at the second level if both the pull up and pull down transistors are switched on;
    an inverter having an input coupled to the output node and an output coupled to the pull up transistor in a manner that provides positive feedback;
    an ESD protection circuit coupled to the input pad and the output node, the ESD protection circuit being enabled to couple the input pad to ground when the output node is set to the first level; and
    a timer circuit that switches on the pull down transistor in response to detecting a predetermined condition.

3. The arrangement of claim 2 wherein the timer circuit switches the pull down transistor on within a second predetermined time of a supply output voltage exceeding a predetermined level.

4. The arrangement of claim 2 further comprising a breakdown detection circuit comprising:
    a bipolar junction transistor having an emitter coupled to the input pad and a collector coupled to the output node;
    a resistor coupled between the emitter of the bipolar junction transistor and a base of the bipolar junction transistor; and
    a field effect transistor having a gate and a source coupled to ground and a drain coupled to the base of the bipolar junction transistor.

5. The arrangement of claim 2 wherein the timer circuit comprises:
    a capacitor having a first terminal coupled to a gate of the pull down transistor and a second terminal coupled to ground; and
    a transistor having a source coupled to receive the supply output voltage, a drain coupled to the first terminal of the capacitor, and a gate biased to cause the transistor to be switched on.

6. The arrangement of claim 5 wherein a first diode is coupled between the supply output voltage and the source of the transistor.

7. The arrangement of claim 6 wherein a second diode is coupled between a second supply output voltage and the source of the transistor.

8. A circuit that steers current in response to an electrostatic discharge (ESD) event, comprising:
    an input pad;
    a latch coupled to the input pad, the latch generating an output signal for a first predetermined period of time in response to the ESD event, wherein the first predetermined period of time is greater than a period of time required for the ESD event;
    a timer circuit that disables the latch from generating the output signal a second predetermined time after a power supply output voltage reaches a first predetermined level; and
    an ESD protection circuit that is enabled to couple the input pad to ground in response to the output signal generated by the latch.

9. The circuit of claim 8 wherein the latch further comprises a breakdown detector to generate the output signal in response to breakdown of transistors in the latch.

10. The circuit of claim 8 wherein the timer circuit disables the latch a third predetermined time after a second power supply output exceeds a second predetermined level.

11. A method for protecting an integrated circuit from an electrostatic discharge (ESD) event, comprising:
    enabling, for a first predetermined period of time, an ESD protection circuit that, when enabled, couples an input pad to ground such that current associated with the ESD event is shunted to ground to function when a supply output voltage provided to the integrated circuit is less than a predetermined voltage wherein the first predetermined period of time is greater than a period of time required for the ESD event to occur; and
    disabling the ESD protection circuit from functioning when the supply output voltage is at the predetermined voltage for a second predetermined period of time.

12. The method of claim 11 further comprising the step of enabling the ESD protection circuit to function when a voltage at the input pad would cause breakdown in transistors of the integrated circuit.

* * * * *